United States Patent [19]

Taliercio et al.

[11] Patent Number: 5,140,542
[45] Date of Patent: Aug. 18, 1992

[54] METHOD AND DEVICE FOR THE ARITHMETICAL CALCULATION OF TWO-DIMENSIONAL TRANSFORMS

[75] Inventors: Michele Taliercio, Arluno; Mario Lavorgna, Bacoli; Rinaldo Poluzzi; Gianguido Rizzotto, both of Milan, all of Italy

[73] Assignee: SGS Thomson Microelectronics s.r.l., 20041 Agrate Brianza (Milano), Italy

[21] Appl. No.: 531,719

[22] Filed: Jun. 1, 1990

[30] Foreign Application Priority Data

Jun. 2, 1989 [IT] Italy ................................ 20744 A/89

[51] Int. Cl.$^5$ .............................................. G06F 7/38
[52] U.S. Cl. .................................................... 364/725
[58] Field of Search ................................. 364/725, 754

[56] References Cited

U.S. PATENT DOCUMENTS

| | | | |
|---|---|---|---|
| 4,554,629 | 11/1985 | Smith, Jr. | 364/725 X |
| 4,829,465 | 5/1989 | Knauer et al. | 364/725 |
| 4,841,464 | 6/1989 | Guichard et al. | 364/725 |
| 4,912,668 | 3/1990 | Aubie et al. | 364/725 |

FOREIGN PATENT DOCUMENTS 0289629 11/1988 European Pat. Off. .
0335306 10/1989 European Pat. Off. .
63-154205 12/1989 Japan .

OTHER PUBLICATIONS

Article published in *The Institute of Electrical and Electronics Engineers, Inc.*, Oct. 1989, Entitled "The Matrix Transform Chip" by Sailesh K. Rao.

M. A. Haque, "A Two-Dimensional Fast Cosine Transform", IEEE Trans. on Acoustics, Speech, and Signal Processing, vol. ASSP-33, No. 6, Dec. 1985, pp. 1532–1539.

*Primary Examiner*—Long T. Nguyen
*Attorney, Agent, or Firm*—Sixbey, Friedman, Leedom & Ferguson

[57] ABSTRACT

A method for the arithmetical calculation of two-dimensional transforms including two time steps of multiplication and accumulation, of which the first step is assigned to the product of the data and of the coefficient matrices and the second step is assigned to the subsequent product by the transposed coefficient matrix. Moreover, preferably the data to be transformed and the corresponding coefficients are supplied to a first multiplication step in time succession, possibly after their storage in an appropriate memory. The device for the attainment of the method includes two multipliers with their corresponding accumulator, a random-access type memory for storing the data to be transformed and the transform coefficients, a multiplexer which receives the data first from the input and then from the memory and arranges them in a time succession for the supply to a first multiplier, and a shift register which receives the transform coefficients from the memory and arranges them for the supply to the second multiplier.

3 Claims, 2 Drawing Sheets

METHOD AND DEVICE FOR THE ARITHMETICAL CALCULATION OF TWO-DIMENSIONAL TRANSFORMS

BACKGROUND OF THE INVENTION

1. Field of the Invention

The present invention relates to a method and a device for the arithmetical calculation of two-dimensional transforms.

2. Description of Related Art

In many fields of technology there exists the need of executing coding for transmission and recording of numerical signals by means of two-dimensional transforms.

This coding technique ensures the decorrelation of the original signal and executes its energy compacting. Such an operation reduces signal redundancy, allowing the minimization of the quantity of information necessary for coding.

For any type of signal (voice, video, data), the optimum transform in terms of decorrelation capacity is the Karhunern-Loewe transform; unfortunately the computational complexity of the algorithm, and as a consequence the length of calculation time required, makes it difficult to use it within the ambit of industrial applications wherein it is required that the signal transform operation be carried out in real time (coding of images in motion).

In practice different types of sub-optimum unitary transforms are used: discrete Fourier transform, discrete sine transform, discrete cosine transform, Hadamard transform, slant transform.

The choice of a particular type of unitary transform is dictated by the statistical characteristics of the signal to be coded.

The devices available on the market are designed to support only one particular type of unitary transform.

SUMMARY OF THE INVENTION

The object of the present invention is to design a method and a device for the arithmetical calculation of any two-dimensional unitary transform which allows operations in real time with a high speed of calculation and which has a particularly simple architecture.

According to the invention such object is attained by means of a method characterized in that it comprises two time steps of multiplication and accumulation, a first step being assigned to the product of the data and of the coefficient matrices and a second step being assigned to the subsequent product by the transposed coefficient matrix.

According to the invention it is also provided that the data to be transformed and the corresponding coefficients be supplied to the first multiplication step in a time succession, possibly after being stored in a suitable memory.

It has been possible to note that in this way a good compromise has been obtained between the occupation of silicon area and the speed of calculation.

According to the invention there is further accomplished a device for the attainment of the above method, characterized in that it comprises two multipliers with their corresponding accumulator, a first multiplier with its corresponding accumulator executing the multiplication of the transform coefficient matrix by the input data matrix, a second multiplier with its corresponding accumulator receiving at input the result of this first multiplication and multiplying it by the transposed transform coefficient matrix.

In addition, still according to the invention provision is made for the device to include a RAM-type memory for storing the data to be transformed and the transform coefficients together with a multiplexer which receives said data first from input and then from storage, and arranges them in a time succession for supply.

With the introduction of the multiplexer it has been possible to attain considerable speeds of calculation, while the use of the RAM memory has allowed extreme operational flexibility allowing, as the case may be, to select the type of the transform most suitable for the particular problem to be solved. The transform's arithmetical calculation thus becomes programmable simply by varying the transform coefficients stored in the RAM.

These and other features of the present invention shall be made evident by the following detailed description of an embodiment illustrated as a non-limiting example in the enclosed drawings, wherein:

DESCRIPTION OF THE PREFERRED EMBODIMENT(S)

Figure 1:
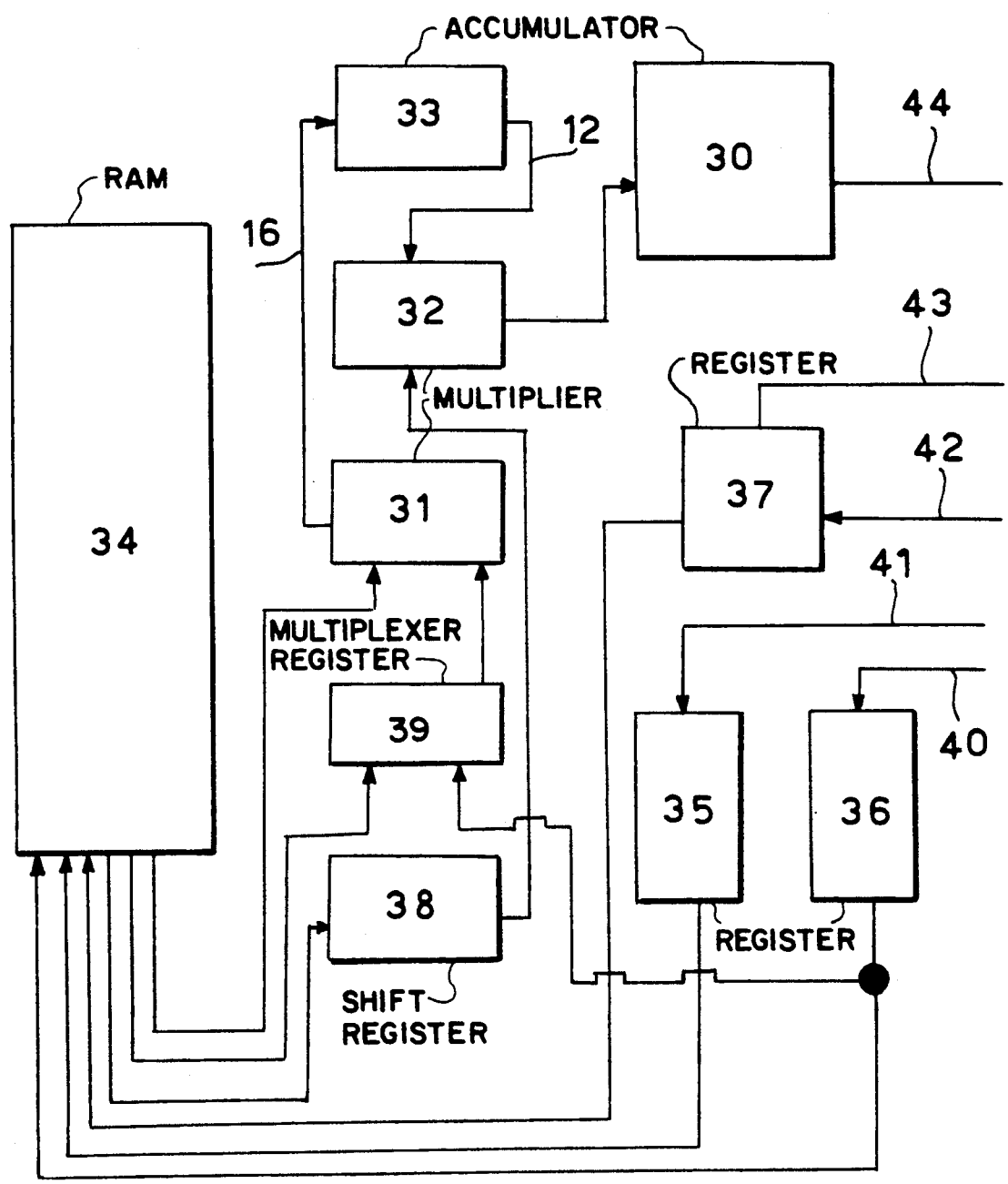
FIG. 1 shows the architecture of a device according to the invention.

Considering first FIG. 1, the device according to the invention essentially comprises two multipliers 31, 32, in series having $8 \times 8$ and $12 \times 8$ bits respectively, which both work in module and token. At the output of the multiplier 31 there is arranged a first accumulator, indicated in the figure with 33, which has the task of accumulating the first matrix product (data matrix by coefficient matrix). Internally said accumulator 33 contains in a way known in itself and not shown in the drawing an adder/subtractor (piloted by the token bit and operating on the module coming from the multiplier 31) for the accumulation of the partial sums necessary for the first matrix operation, a second adder/subtractor for the reconversion to module and token, six registers for the reconversion of the data flow and two multiplexers necessary for accumulator reset.

A dual-gate RAM 34 with the possibility of partially writing each word's content is in a position of memorizing the coefficient matrix and that of the data; its dimensions (18 bits for 64 words) makes it possible to have both the data and the coefficients available with just one address. Programming of RAM 34 is executed by varying the content of the part of RAM 34 containing the transform coefficients. The contents of the part of RAM 34 containing the data is varied each time a new matrix to be transformed arrives.

The input lines to RAM 34 come from three registers, of which the registers indicated with 35 and 36 load the coefficients and the matrix data, respectively, transforming them from the twos complement notation to that of module and token. Said input data and coefficients are supplied to registers 35, 36 along input buses 40, 41. The third register indicated with 37 is controlled by a suitable microprocessor with which it communicates by means of connections 42, 43 and contains a programmable logic array (PLA) to generate the control signals for controlling the device's logic operation, a random logic supporting the PLA and a 9-bit counter to generate the RAM 34 addresses.

A set of three connections depart from RAM 34, two of which are used to supply the coefficients of the transposed matrix to the multiplier 32 through a shift register 38 and to supply the data to be transformed to a two-to-one multiplexer register indicated with 39 with which it is possible to route on the first multiplier 31 the data coming from register 36 (for the first 64 clock cycles) or from RAM 34 (subsequent clock cycles), respectively. The third connection allows the RAM to supply the transform coefficients to multiplier 31.

An accumulator 30 allows the accumulation of a second matrix product (first matrix product by transposed matrix coefficient) giving a twos complement output. Inside it, in a way known in itself and not shown in the drawing, there are just one adder/subtractor (driven by the token bit and operating on the module coming from the output of accumulator 33), a multiplexer for reset, nine registers for the synchronization of the data flow.

The output line 44 departs from said accumulator.

Due to the effect of the described structure, during its operation the device occupies in succession a group of three states, wait, load, calculation, the transition between which is regulated by a group of commands by means of which the device executes the transform operation.

Figure 2:
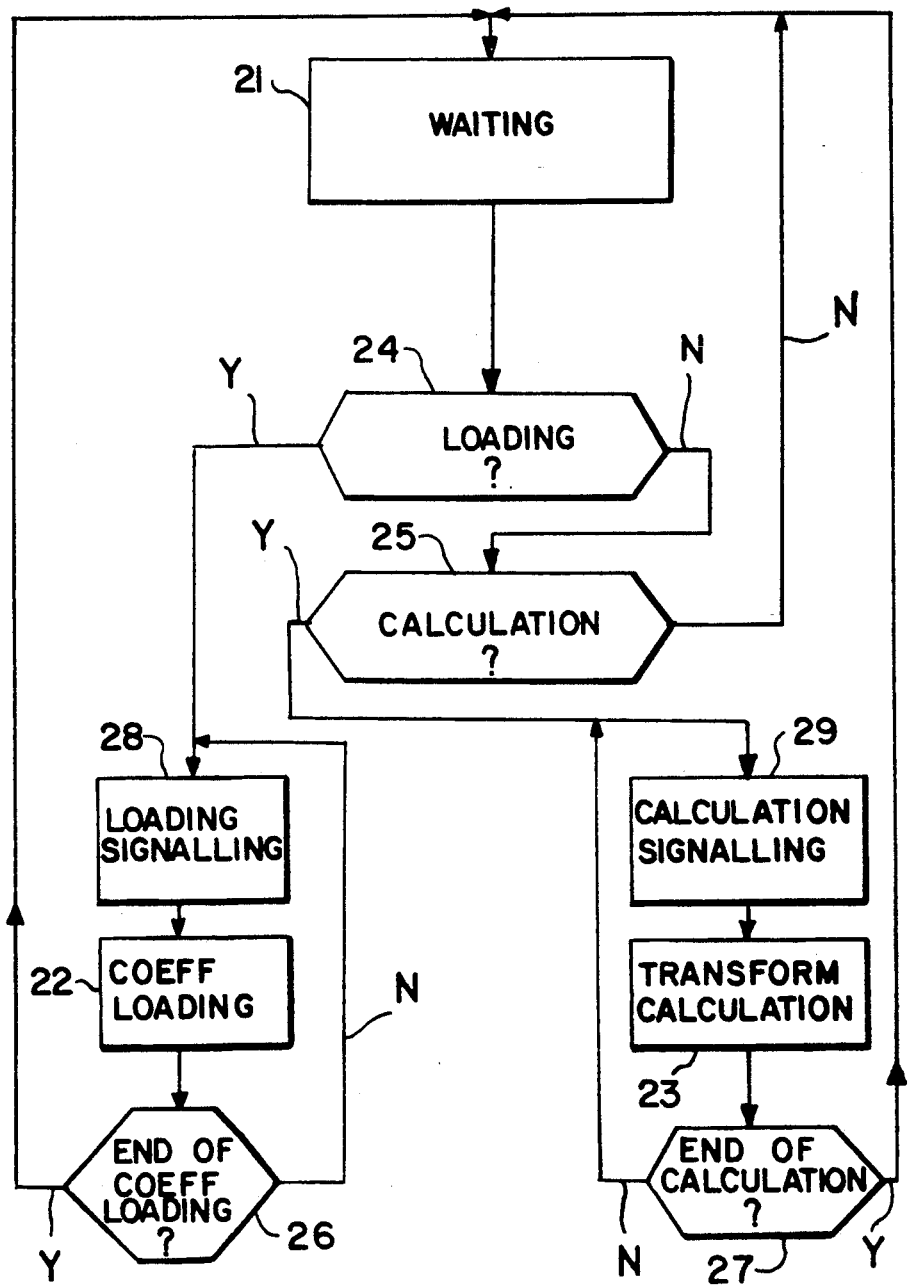
FIG. 2 shows the logic operating sequence of the device in compliance with the method according to the invention.

The flow chart related to this group of commands is represented in FIG. 2.

In it there are present three functional blocks 21, 22, 23, corresponding to the steps of waiting, coefficient loading and transform calculation, and decision blocks for loading 24, calculation 25, end of coefficient loading operation 26, and end of calculation operation 27, respectively.

There are also two blocks, indicated with 28, 29, to signal that the coefficient loading step 22 or the calculation step 23 are under way, respectively. A suitable operational flag is asserted (set to one) during such steps.

The letters Y and N indicate positive or negative replies at the output from decision blocks 24, 25, 26, 27.

More precisely, from the waiting step, functional block 21, inside which an operational flag is forced to 0, we go to the step of loading request, block 24, from which in case of a positive reply Y we go to the coefficient loading step, functional block 22, having previously signalled the start of this step by giving a value 1 to the operational flag inside block 29. The input register 35 of FIG. 1 then loads the transform coefficient into RAM 34.

In case of a negative reply at the output of the loading decision block 24 we go to the calculation decision block 25.

From this block, in case of a negative reply we return to the waiting step, functional block 21; in case of a positive reply, on the other hand, we go to functional block 23, corresponding to the calculation step, having previously signalled the start of this step by giving a value 1 to the operational flag in block 28. There is thus started the operation of transform calculation using for the first 64 clock cycles the data loaded by the input register 36 of FIG. 1 and for the following the matrix data loaded in the meantime by the same register 36 into RAM 34. The calculation is executed by the two multipliers 31 and 32 of FIG. 1 with their corresponding accumulators 33 and 30, first executing the multiplication of the data matrix by the coefficient matrix and then the multiplication of the corresponding result by the transposed coefficient matrix.

From the end of operation decision blocks 26, 27 we finally return with a positive reply, that is to the completion of the corresponding operation, to the wait step, functional block 21, while in the case of a negative reply we continue the current operation returning through block 29 and 28 to the loading and calculation functional block 22 and 23.

It should be noted that the calculation of the two-dimensional transform is programmable by varying only that part of RAM (34) which contains the matrix of the transform coefficients.

We claim:

1. A device for arithmetical calculation of two-dimensional transforms, comprising coefficient and data inlet means, a random access memory (RAM) connected to receive information from said data inlet means for storage of a matrix of transform coefficients and a matrix of data to be transformed supplied by said inlet means, a first multiplier for initial multiplication of said coefficients and data, means connected to said RAM and said first multiplier for transferring said transform coefficients from the RAM to said first multiplier, a multiplexer connected between said RAM and said first multiplier for transferring said data from said RAM to said first multiplier in time succession, a first accumulator connected to said first multiplier for storage of a result of said initial multiplication, a second multiplier connected to said first accumulator for further multiplication of said result of said initial multiplication by a transposed transform coefficient matrix supplied by the RAM and a second accumulator connected to said second multiplier for storage of a result of said further multiplication.

2. A device according to claim 1, wherein said multiplexer is further connected to said data inlet means to transfer data directly from said data inlet means to said first multiplier for a preselected number of clock cycles of the multiplexer before starting transfer of data from the RAM.

3. A device according to claim 1, further comprising a delay circuit interposed between the RAM and the second multiplier for delayed transfer of said transform coefficients.

* * * * *